July 14, 1953

N. J. ALLBRIGHT ET AL
AUTOMATIC APPARATUS FOR INJECTING CURING
LIQUID INTO HOG BELLIES AND THE LIKE 2,645,172

Filed Sept. 27, 1951

INVENTORS
NORMAN J. ALLBRIGHT
RALPH W. ILLSLEY &
BERTIE S. HARRINGTON

By: Fred Gerlach Atty.

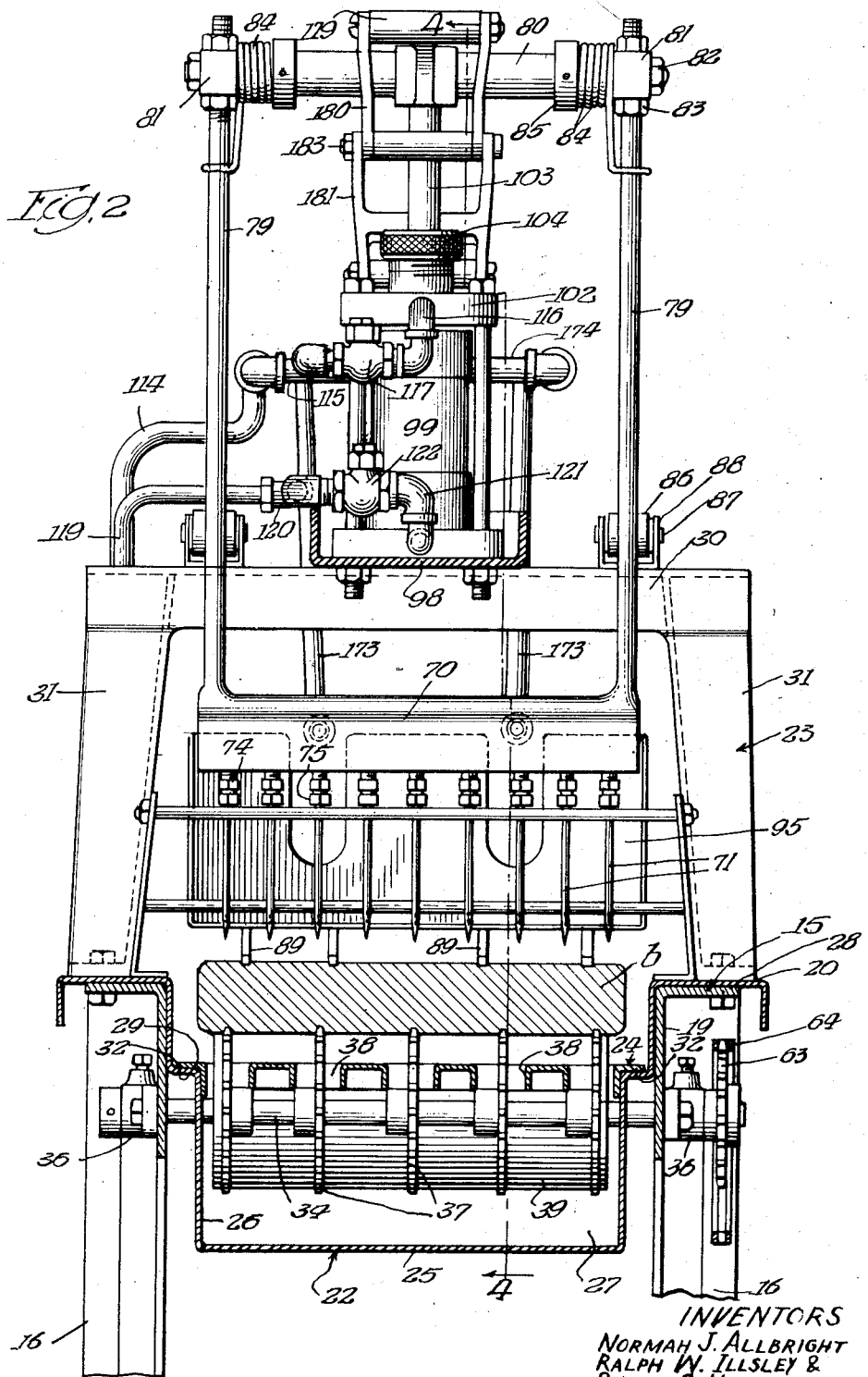

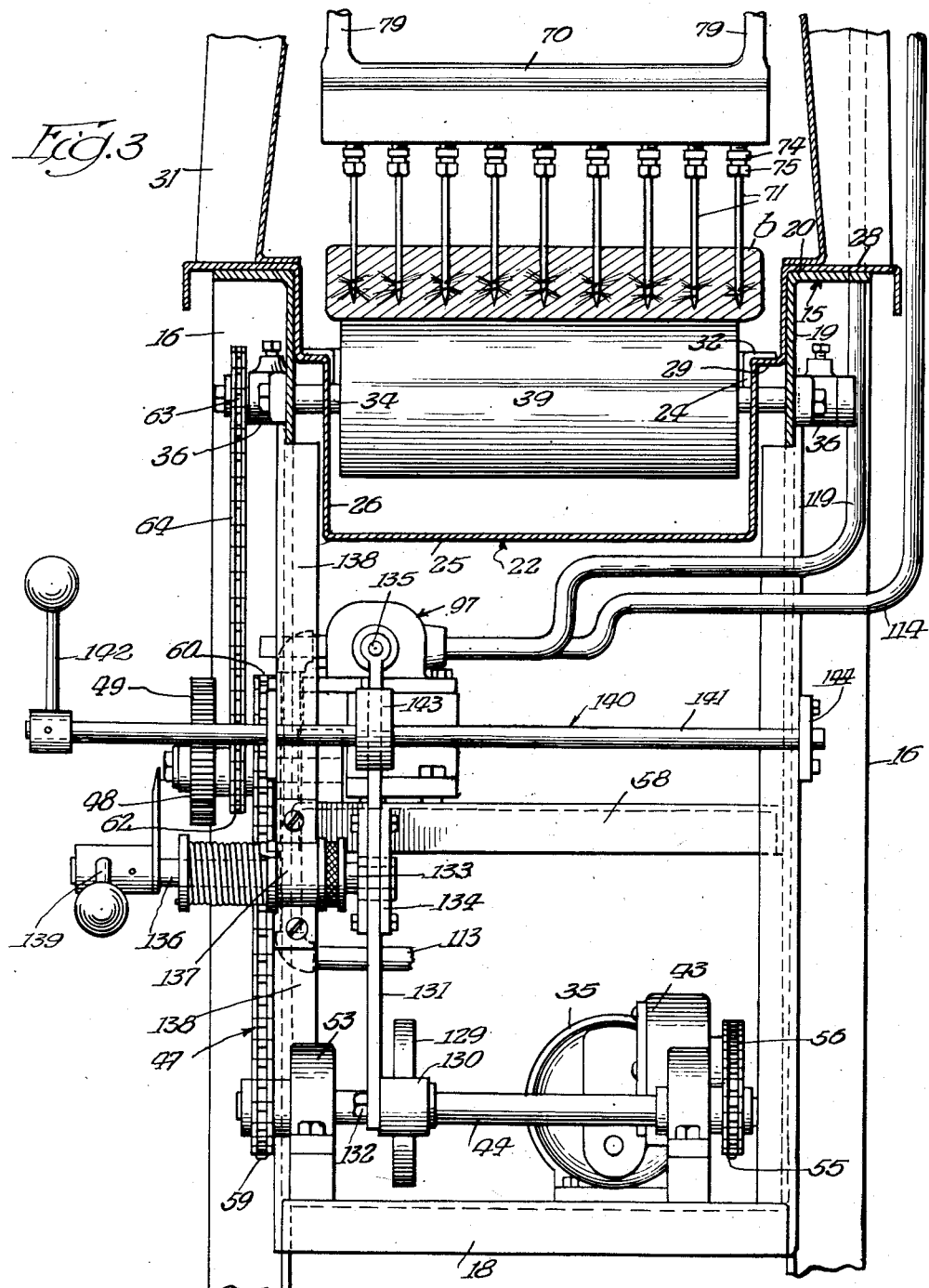

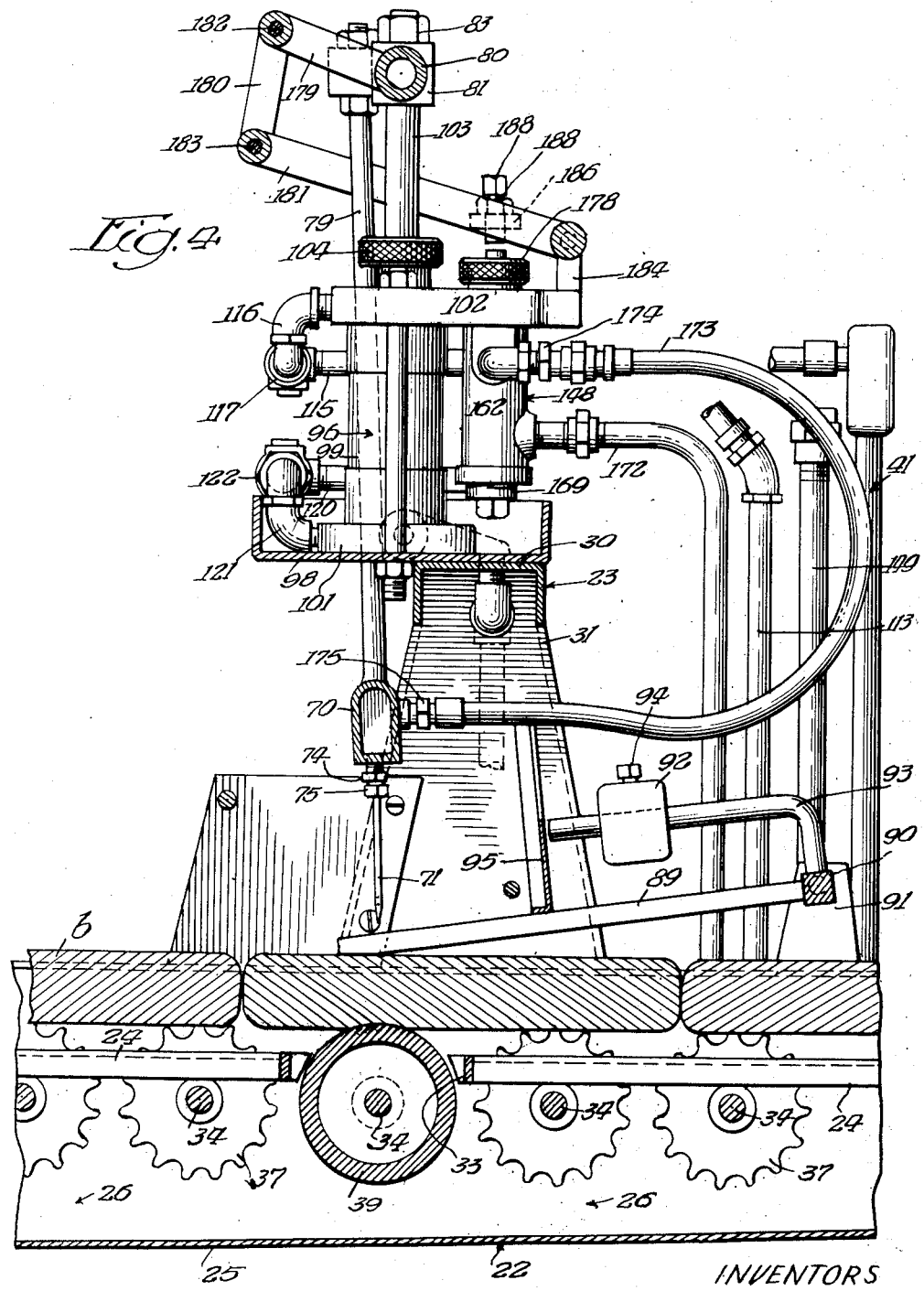

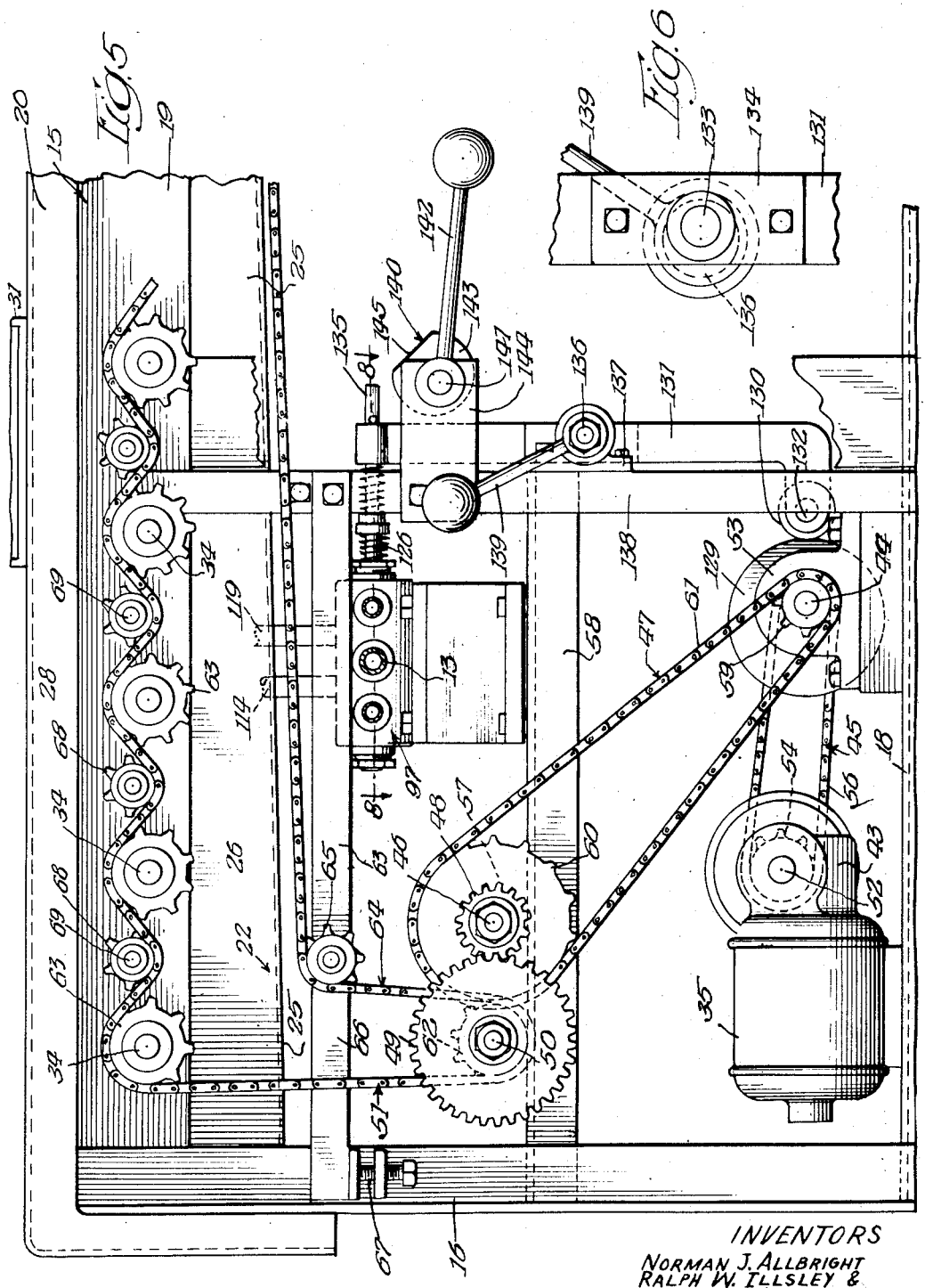

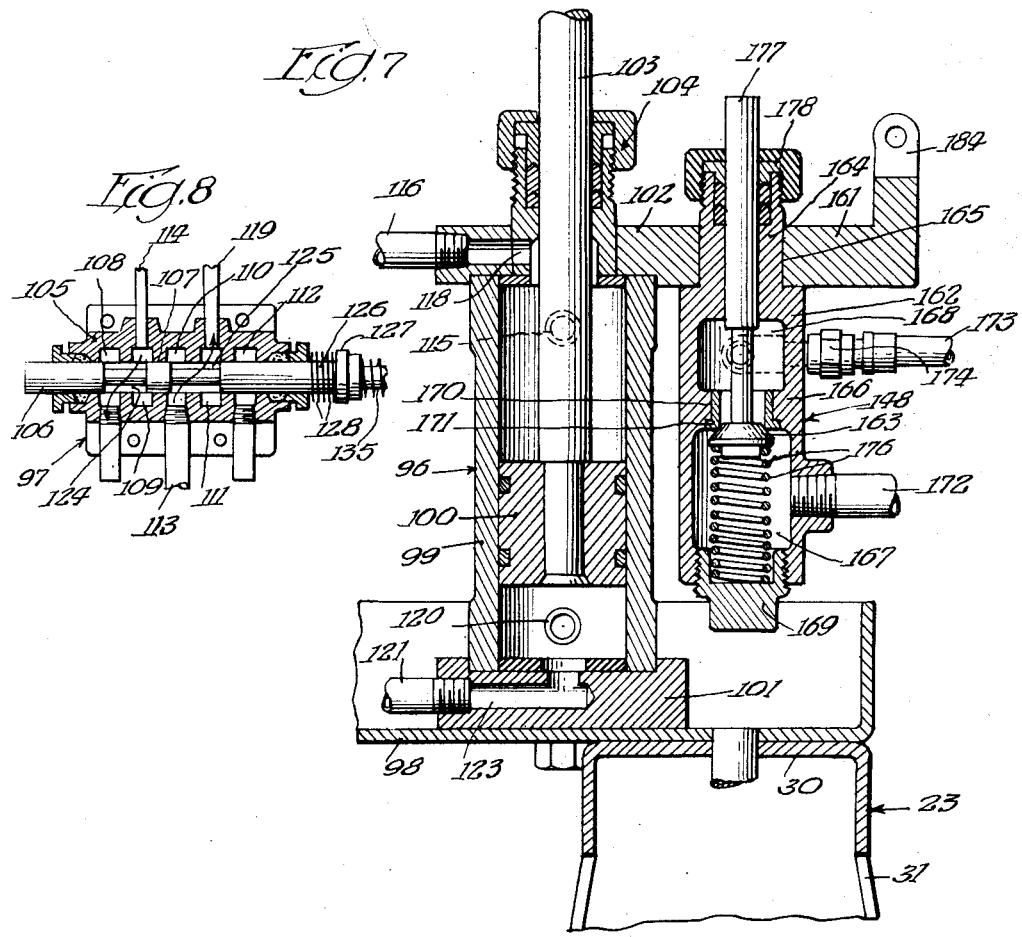
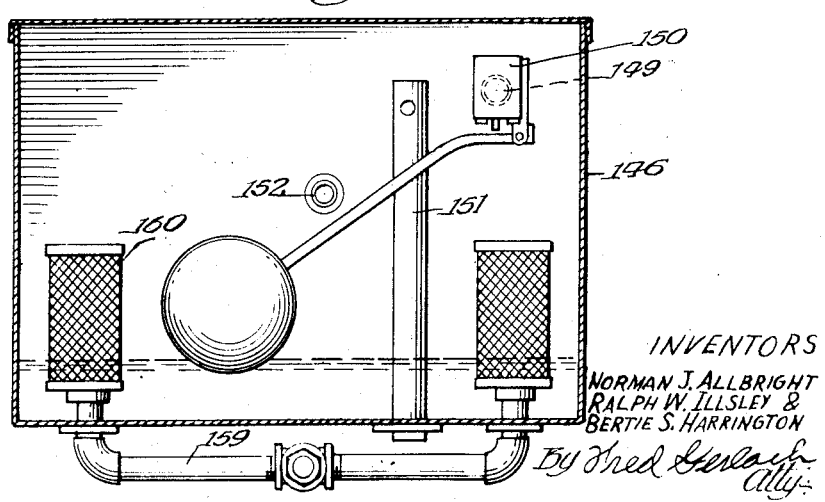

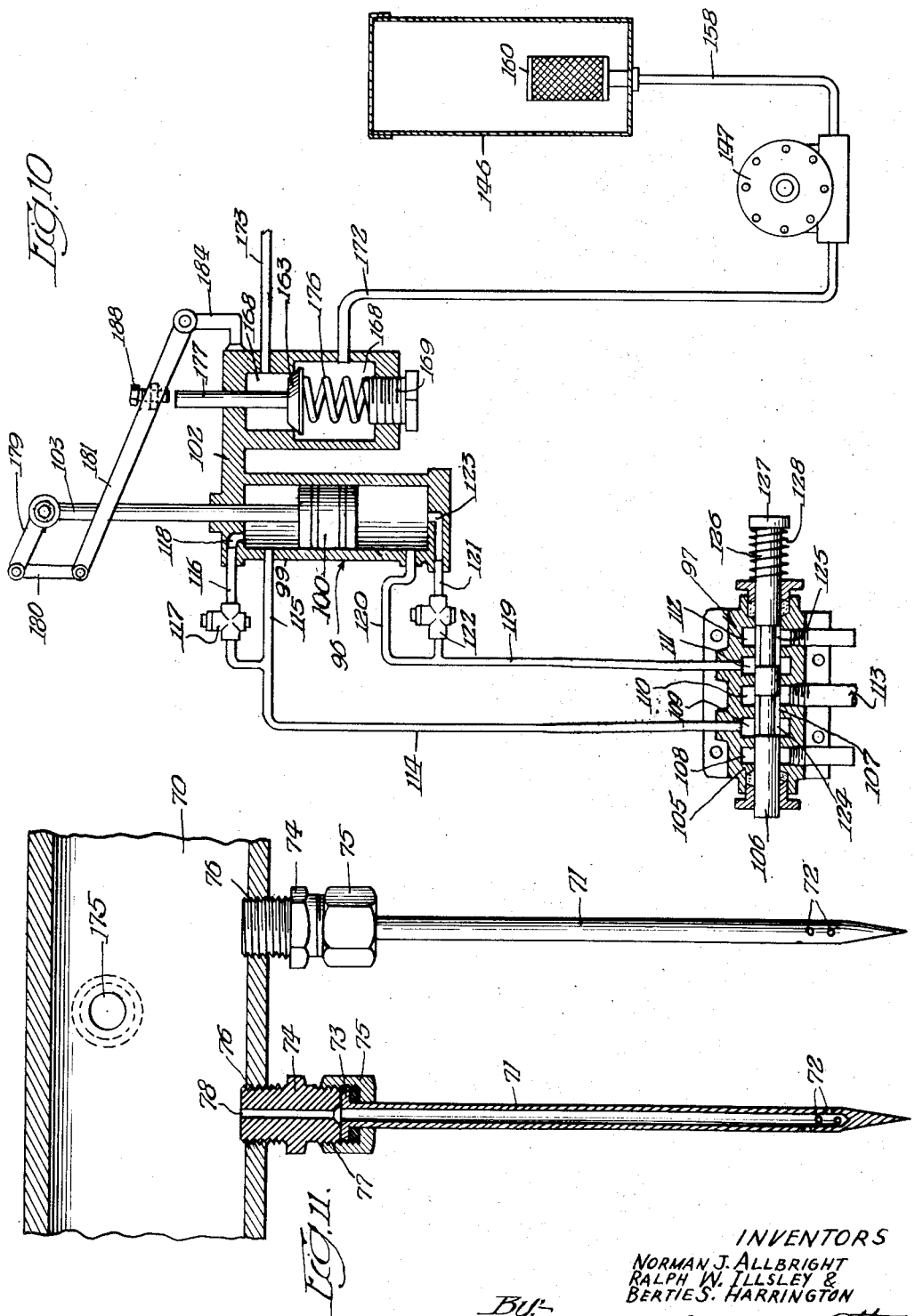

Patented July 14, 1953

2,645,172

UNITED STATES PATENT OFFICE 2,645,172

AUTOMATIC APPARATUS FOR INJECTING CURING LIQUID INTO HOG BELLIES AND THE LIKE

Norman J. Allbright, Ralph W. Illsley, and Bertie S. Harrington, Chicago, Ill., assignors to The Allbright-Nell Company, Chicago, Ill., a corporation of Illinois Application September 27, 1951, Serial No. 248,578

30 Claims. (Cl. 99—257)

The present invention relates generally to apparatus for injecting curing liquid, such as brine, into hog bellies and the like. More particularly the invention relates to that type of brine injecting apparatus which is designed primarily for use in a meat packing plant in connection with the production of bacon and as its principal components or parts comprises: (1) a horizontally elongated frame structure which is adapted to rest on the floor of the packing plant and embodies at the upper portion thereof means for supporting the bellies to be treated so that they move lengthwise thereof, one after the other; (2) a horizontally extending crosshead which is positioned over and transversely of the frame structure, has a longitudinal series of fixed downwardly extending spaced apart hollow needles with discharge apertures at their lower ends and is mounted so that it is bodily movable down and up in order to effect insertion of the needles into the subjacent belly and subsequent withdrawal therefrom; (3) mechanism which operates automatically and in timed relation with feed of the bellies under the needle carrying crosshead to move the crosshead down and up; and (4) automatic mechanism whereby each time the needles are brought into penetrating relation with the subjacent belly brine is forced under pressure through the needles in such belly.

One object of the invention is to provide an apparatus of this type which is an improvement upon, and has certain inherent advantages over, previously designed apparatus for the same purpose and is characterized by extremely high efficiency, a novel and compact arrangement of parts, and high speed and completely automatic operation.

Another object of the invention is to provide a brine injecting apparatus of the type under consideration in which the hog bellies to be treated are fed continuously, as contradistinguished from intermittently, under the needle carrying crosshead and the crosshead is mounted by way of upstanding arms with pivotal connections at their upper ends so that after it is moved downwards to effect penetration of the needles into the subjacent belly it is permitted to move along with such belly until it is moved upwards to effect withdrawal of the needles from the belly.

Another object of the invention is to provide a brine injecting apparatus of the last mentioned character in which the upper ends of the upstanding arms that carry the crosshead are pivotally connected to the ends of a horizontally extending shaft which extends transversely of the frame structure and has its central portion connected to the upper end of a vertically extending piston rod of a pneumatically actuated cylinder-piston unit and has springs between its ends and the upper ends of the upstanding arms for automatically retracting the crosshead to its normal starting position each time it is raised in connection with withdrawal of the needles from the subjacent belly.

Another object of the invention is to provide a brine injecting apparatus of the aforementioned character in which the crosshead is hollow and the automatic mechanism whereby each time the needles are brought into penetrating relation with the subjacent belly brine is forced under pressure through the needles, comprises piping between the crosshead and a source of brine under pressure and a stationary control valve which is included in the piping and is automatically opened each time the aforementioned horizontally extending shaft is lowered to effect downward movement of the hollow needle carrying crosshead.

Another object of the invention is to provide a brine injecting machine of the type and character under consideration in which the mechanism for moving the needle carrying crosshead down and up comprises, in addition to the aforementioned pneumatically actuated cylinder-piston unit, a valve which serves alternately to control the supply and exhaust of air to opposite ends of the cylinder of the unit and has an actuating member therefor which is so adjustable that, through the medium of valve actuation, the length of time in which the hollow needles are in penetrating relation with the subjacent belly and resultantly the amount of injected brine may be varied as desired.

Another object of the invention is to provide a brine injecting apparatus of the aforementioned type in which the means for continuously feeding the bellies, one after the other, under the needle carrying crosshead comprises a longitudinal series of horizontal equidistantly spaced shafts with teeth equipped wheels thereon, an electric motor and gearing between the motor and certain ends of the shafts.

Another object of the invention is to provide a brine injecting apparatus of the last mentioned character in which the electric motor for driving the shafts with the teeth equipped belly supporting wheels thereon serves also to drive a cam wheel which in connection with drive thereof operates the actuating member for the valve of the mechanism for moving the needle carrying crosshead down and up.

A further object of the invention is to provide a brine injecting apparatus of the type under consideration in which the upper ends of the hollow needles have associated with them flow restricting means in the form of reduced ducts which establish communication between the upper ends of the needles and the crosshead interior and serve so to reduce the pressure of the brine in the needles that substantially uniform quantities of the brine are discharged from the needles even though some of the needles penetrate lean portions of the subjacent belly and other needles penetrate fat portions.

A still further object of the invention is to provide a brine injecting apparatus which is generally of new and improved construction, may be manufactured at a comparatively low cost and effectively and efficiently fulfills its intended purpose.

Other objects of the invention and the various advantages and characteristics of the present brine injecting apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 2 is a vertical transverse section taken on the line 2—2 of Figure 1 and illustrating in detail the construction and manner of mounting of the needle carrying crosshead;

Figure 3 is a vertical transverse section taken on the line 3—3 of Figure 1 and showing the arrangement and location of the valve and valve actuating member of the mechanism for moving the needle carrying crosshead down and up;

Figure 1:
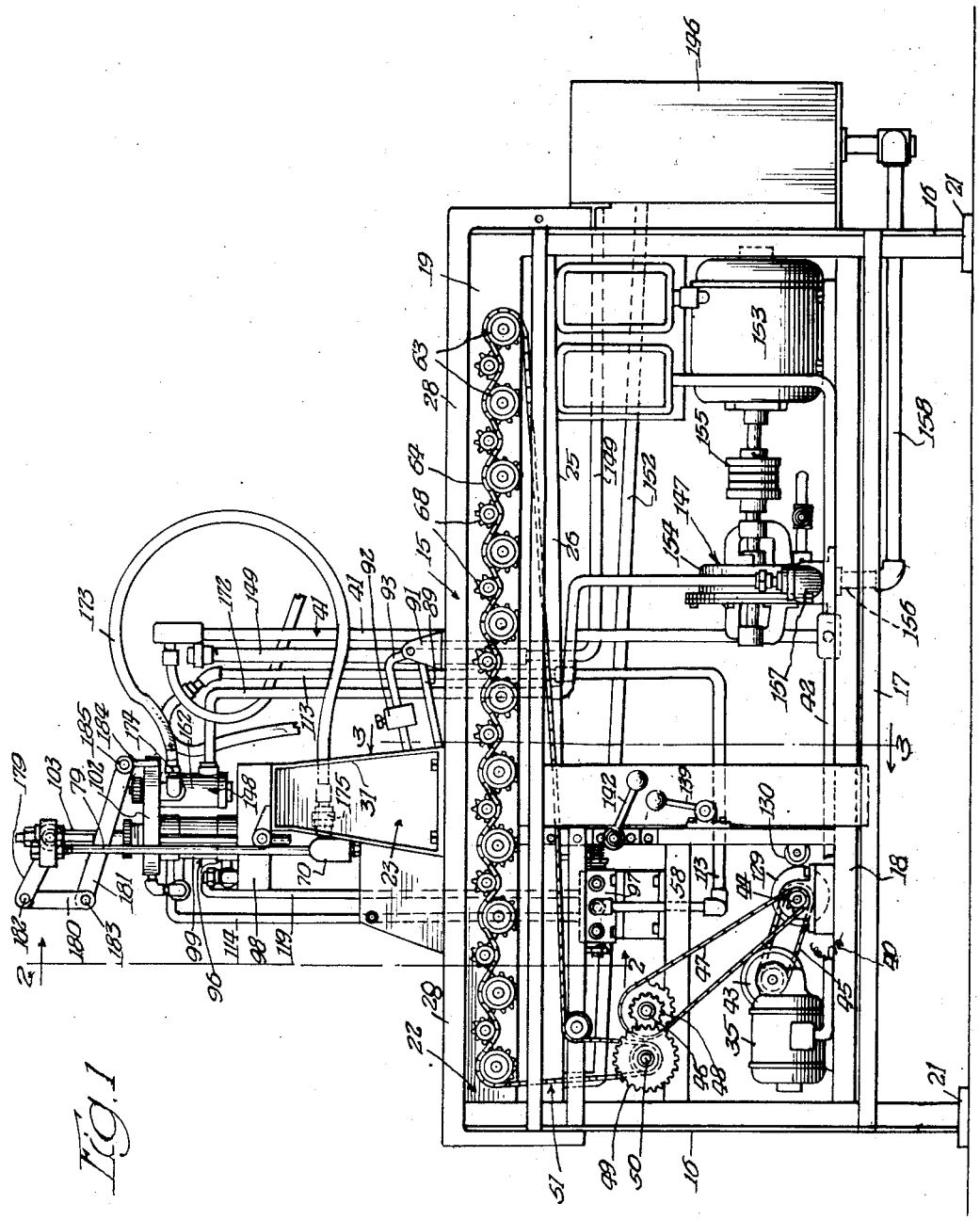
Figure 1 is a side view of a brine injecting apparatus embodying the invention.

Figure 4 is a vertical longitudinal section taken on the line 4—4 of Figure 2 and illustrating in detail the arrangement and location of the pneumatically actuated cylinder-piston unit of the mechanism for moving the crosshead down and up and the stationary valve constituting part of the automatic mechanism whereby each time the needles are brought into penetrating relation with a subjacent belly brine is forced under pressure through the needles;

Figure 5 is an enlarged side elevation of the discharge end portion of the apparatus, showing in detail the electric motor and gearing for driving the shafts with the teeth equipped bacon supporting wheels thereon and also showing the means for adjusting the fulcrum for the lever that constitutes the actuating member for the valve of the mechanism for moving the needle carrying crosshead down and up;

Figure 6 is an enlarged side view of the means for adjusting the valve actuating member;

Figure 7 is an enlarged vertical section of the cylinder-piston unit of the mechanism for moving the needle carrying crosshead down and up and the stationary control valve of the automatic mechanism for effecting flow of brine under pressure through the needles when the latter are in penetrating relation with a subjacent belly;

Figure 8 is a horizontal section taken on the line 8—8 of Figure 5 and illustrating in detail the construction and arrangement of the valve which serves alternately to control the supply and exhaust of air to opposite ends of the cylinder of the cylinder-piston unit;

Figure 9 is a vertical transverse section taken on the line 9—9 of Figure 1 and showing in detail the brine storage and supply tank;

Figure 10 is a diagrammatic view, partly in section and partly in elevation, of the pneumatically operated mechanism for moving the needle carrying crosshead down and up, and the coacting mechanism for causing brine under pressure to flow through the hollow crosshead and the needles when the needles are in penetrating relation with a subjacent belly; and Figure 11 is a fragmentary longitudinal sectional view of the hollow crosshead, illustrating in detail the manner in which the depending belly penetrating needles are connected to the crosshead.

The apparatus that is illustrated in the drawings constitutes the preferred form or embodiment of the invention. It is designed primarily for use in a packing plant and serves as a medium or instrumentality for injecting a curing liquid, such as brine, into hog bellies $b$ in connection with the production of bacon. As its principal parts the apparatus comprises a frame structure, mechanism for feeding the bellies to be treated, one at a time, along the top portion of the frame structure, a hollow horizontally elongated needle carrying crosshead over the central portion of the frame structure, mechanism for automatically moving the crosshead down and up in order successively to effect insertion of the needles into the subjacent belly and subsequent withdrawal therefrom, and mechanism for forcing brine under pressure through the needles and into the subjacent belly each time the crosshead is moved downwards. Generally speaking the apparatus is of unitary character and wholly automatic.

*Frame structure*

The frame structure is horizontally elongated and serves as a support for the other parts of the apparatus. It is adapted to rest on the floor of the packing plant and comprises a pair of horizontally extending, parallel, laterally spaced upper members 15, four vertically extending legs 16, a pair of horizontally extending, parallel, laterally spaced lower members 17 and a platform 18. The upper members 15 are in the form of angle bars (see Figure 2) and comprise vertically extending parts 19 and horizontally extending parts 20. The horizontally extending parts of the upper members 15 are connected to, and project outwards from, the upper margins of the vertically extending parts 19. The legs 16 serve to support the upper members 15 in an elevated position and are suitably crossconnected. The upper ends of the legs are fixedly connected to the ends of the upper members 15 and the lower ends of the legs are provided with flat floor-engaging feet 21. Preferably the legs 16 are in the form of angle bars. The horizontally extending lower members 17 extend between, and have their ends fixedly secured to, the lower portions of the legs 16. The platform 18 is located directly above the horizontally extending lower members 17 and has its corners secured to the lower portions of the legs 16.

In addition to the parts heretofore mentioned the frame structure comprises an elongated, trough-like pan 22, an inverted U-shaped bracket 23 and a pair of trays 24.

The pan 22 extends lengthwise of, and is disposed between, the upper members 15 and consists of a flat bottom wall 25, a pair of side walls 26 and a pair of end walls 27. The bottom wall 25 of the pan 22 is downwardly inclined from the receiving end of the apparatus (right hand end of the apparatus as viewed in Figure 1) to the discharge end. The side walls 26 are connected to, and project upwards from, the side margins of the bottom wall 25 and are provided at the upper margins thereof with integral outwardly extending flanges 28 which rest on the horizontally extending parts 20 of the upper members 15. The central portions of the side walls 26 are bent outwards and then upwards to form upwardly facing, longitudinally extending shoulders 29. The end walls 27 of the pan are connected to, and extend upwards from, the end margins of the bottom wall 25 and have the side margins thereof joined to the end margins of the side walls. The pan 22 is preferably in the form of a sheet metal stamping and serves as a receiver for excess brine.

The inverted U-shaped bracket 23 is disposed over, and extends transversely of, the central portions of the upper members 15 and consists of a horizontally extending crosspiece 30 and a pair of side pieces 31. The side pieces serve to support the crosspiece 30 in an elevated position with respect to the upper members 15 of the frame structure and have the upper ends thereof suitably connected to the ends of the crosspiece. The lower ends of the side pieces 31 are bolted or otherwise fixedly secured to the central portions of the horizontally extending parts 20 of the upper members 15.

The trays 24 are elongated. They are disposed in longitudinal alignment and fit within, and extend lengthwise of, the end portions of the interior of the pan 22. The side margins of the trays 24 are provided with outwardly extending flanges 32 and these, as shown in Figure 2 of the drawings, rest loosely on the upwardly facing shoulders 29 on the central portions of the pan side walls 26 in order that the trays may be readily removed for cleaning purposes. The inner ends of the two trays are spaced apart to provide an opening 33 between the two trays, as shown in Figure 4.

*Belly feeding mechanism*

The belly feeding mechanism of the apparatus serves continuously to feed the bellies to be treated in series form over, and lengthwise of, the trays 24 of the supporting structure. It is mounted on the supporting structure and comprises a series of horizontally extending, parallel, equidistantly spaced shafts 34, an electric motor 35 and gearing between the motor and the shafts.

The shafts 34 are spaced apart a distance less than the width of a belly and extend transversely or crosswise of the frame structure. They are located directly beneath the trays 24 and extend through aligned holes in the side walls 26 of the pan 22 and the vertically extending parts 29 of the upper members 15. The ends of the shafts 34 are journalled in bearings 36 which, as shown in Figure 2, are bolted against the outer faces of the vertically extending parts 19. Each of the shafts 34, with the exception of the shaft that is disposed beneath the opening 33, is provided with a series of equidistantly spaced, teeth-equipped belly supporting wheels 37, the hubs of which are keyed or otherwise fixedly secured in place. The upper portions of the wheels 37 extend through longitudinally extending slots 38 and serve as the supporting means for the bellies b. It is contemplated that the shafts 34 will be driven in a counterclockwise direction as viewed in Figures 1, 4 and 5 of the drawings. It is also contemplated that the bellies will be placed, one at a time, on the upper portions of the teeth-equipped wheels on the shaft that is at the receiving end of the apparatus. In connection with drive of the shafts each belly is fed in a rectilinear course from one set of wheels to the next. As a result of this the bellies move or travel one after the other under the inverted U-shaped bracket 23. The shaft 34 that is located under the opening 33 between the inner ends of the trays 24 is provided with a roller 39. The latter is keyed or otherwise fixedly secured to its shaft. It underlies the needle carrying crosshead and provides a firm support for the superjacent belly as the latter travels over it.

The electric motor 35 is mounted on the left hand end of the platform 18, as viewed in Figure 1, and is arranged so that the armature shaft thereof extends lengthwise of the frame structure. It is preferably a constant speed unidirectional motor and receives electric current by way of conductors 40 which extend downwards through a vertically extending pipe 41 and then sidewise through a horizontal pipe 42. The pipe 42 rests on, and extends lengthwise of, the platform 18 and is connected at one end thereof to the lower end of the pipe 41. The other end of the pipe 42 terminates adjacent the casing of the electric motor 35. It is contemplated that when the apparatus is in operation the electric motor 35 will be driven continuously.

The gearing for driving the shafts 34 from the electric motor 35 comprises a gear type speed reducing unit 43, a horizontal shaft 44, a chain and sprocket connection 45 between the speed reducing unit 43 and the shaft 44, a horizontal shaft 46, a chain and sprocket connection 47 between the shafts 44 and 46, a pinion 48, a gear 49, a horizontal shaft 50 and a chain and sprocket connection 51 between the shaft 50 and the shafts 34. The speed reducing unit 43 of the gearing is mounted on the inner end of the casing of the electric motor 35 and is provided with a horizontal driven shaft 52 which extends transversely of the frame structure of the apparatus. The horizontal shaft 44 extends transversely of the frame structure and is located inwards and downwards with respect to the driven shaft 52 of the speed reducing unit 43. The ends of the shaft 44 are journalled in bearings 53 which, as shown in Figure 3, are mounted on the platform 18 of the frame structure. The chain and sprocket connection 45 comprises a sprocket 54 on one end of the driven shaft 52 of the speed reducing unit 43, a sprocket 55 on one end of the shaft 44 and an endless chain 56 around the two sprockets. The horizontal shaft 46 extends transversely of the frame structure. It is located over the electric motor 35 and is journalled in a bearing 57 which is mounted on a sub-platform 58. The latter forms a part of the frame structure and is located substantially midway between the rear end of the platform 18 and the rear end of the pan 22. The chain and sprocket connection 47 of the gearing comprises a sprocket 59 on the shaft 44, a sprocket 60 on the shaft 46 and an endless chain 61 around the sprockets 59 and 60. The pinion 48 is fixed to the shaft 46 and meshes with, and serves to drive, the gear 49. The shaft 50 extends transversely of the frame structure and is arranged in parallel and side by side relation with the shaft 46. It is journalled in a bearing (not shown) on the sub-platform 58 and carries the gear 49 which is driven by the pinion 48. The chain and sprocket connection 51 comprises a sprocket 62 on the shaft 50, sprockets 63 on certain ends of the shafts 34 and an endless chain 64 around the sprocket 62 and the sprockets 63. The chain 64 extends part way around the sprocket 62, then upwards and part way around the rearmost sprocket 63, then forwards over the upper portions of the other sprockets 63, then rearwards, then partly around a take-up sprocket 65, and finally downwards to the sprocket 62. The take-up sprocket 65 is mounted on the central portion of a substantially horizontal arm 66, one end of which is pivotally mounted, and the other end of which overlies a vertically extending adjusting screw 67. The portions of the chain 64 that extend part way around the sprockets 63 are held in engagement with such sprockets by way of idler sprockets 68. The latter are located midway between the upper portions of the sprockets 63 and are mounted on horizontal shafts 69 which are suitably journalled in, and extend transversely of, the frame structure. When the electric motor 35 is driven it operates through the aforementioned gearing to drive the shafts 34 in a counterclockwise direction as heretofore pointed out. Such drive on the part of the shafts results in the teeth-equipped wheels 37 and the roller 39 feeding the bellies b, one at a time, under the inverted U-shaped bracket 23.

Needle carrying crosshead

The crosshead is designated in the drawing by the reference numeral 70 and extends horizontally. It is located directly behind the inverted U-shaped bracket 23 and is hollow. As best shown in Figure 4 the crosshead 70 has a flat bottom. Brine under pressure is delivered to the interior of the crosshead as hereinafter described. The crosshead extends transversely of the frame structure, carries a longitudinal series of equidistantly spaced depending hollow needles 71, and is in effect a manifold. The needles have pointed lower ends with laterally extending discharge orifices 72. The upper ends of the needles are provided with outwardly extending flanges 73 and are connected to the flat bottom wall of the hollow crosshead 70 by way of nipples 74 and cup shaped centrally apertured nuts 75. The upper ends of the nipples extend through holes in the bottom wall of the crosshead and are connected thereto by screw thread connections 76. The outwardly extending flanges 73 at the upper ends of the needles abut against the lower ends of the nipples and are clamped in place by way of the nuts 75 which surround the upper ends of the needles and are connected to the lower ends of the nipples by way of screw thread connections 77. The nipples have longitudinally extending open ended ducts 78 which establish communication between the interior of the crosshead and the interiors of the needles. The ducts are of less diameter than the internal diameter of the hollow needles. When brine under pressure is introduced into the interior of the crosshead it flows downwards through the ducts 78 in the nipples and then, after flowing longitudinally through the needles, is discharged laterally via the orifices 72 in the pointed lower ends of the needles. The ducts 78 are adapted greatly to reduce the pressure within the needle interiors from that within the crosshead 70. It has been found that by having the pressure within the crosshead several times as great as the pressure within the interiors of the needles that a substantially uniform amount of brine is ejected from each needle during a given time interval even though the needles embedded in belly portions have different amounts of resistance to the outflow of brine through the orifices 72. In actual practice, it has been found advantageous to have the pressure within the hollow crosshead at from 50–150 pounds per square inch and to have the diameter of the ducts 78 such that the pressure of the brine within the needles is about 5–15 pounds per square inch. Duct diameters at between about .03 to .06 of an inch have been found satisfactory, and excellent results are achieved when the ducts have diameters of the order of .045 inch.

The ends of the crosshead are provided with a pair of upstanding parallel arms 79. The latter extend upwards beyond the crosspiece 30 of the inverted U-shaped bracket 23 and are pivotally connected to the ends of a horizontally extending shaft 80 by way of pivot blocks 81. The shaft 80 extends transversely of the frame structure and is shifted downwards and upwards as hereinafter described in order to cause insertion of the lower ends of the needles into the subjacent belly and subsequent removal therefrom. It is contemplated that when the crosshead, in response to downward shift of the shaft 80, is moved downwards so as to effect penetration of the lower ends of the needles into the subjacent belly brine under pressure will be forced through the needles into such belly for belly curing purposes. The pivot blocks 81 are horizontally elongated and extend lengthwise of the frame structure. The front ends of the blocks have circular horizontally extending holes through which the ends of the shaft 80 extend loosely. Nuts 82 on the outer extremities of the shaft 80 hold the pivot blocks in place on the ends of the shaft 80. The rear ends of the pivot blocks 81 are provided with substantially vertical holes through which the upper ends of the arms 79 extend. Such ends of the arms have clamp nuts 83 which are arranged in straddled relation with the rear ends of the pivot blocks and serve to hold the arms 79 against axial displacement with respect to the blocks. The blocks 81 form pivotal connections whereby the needle carrying crosshead after it is moved downwards to effect penetration of the needles into the subjacent belly, is permitted to move along with the belly until it is moved upwards to effect withdrawal of the needles from the belly. Coil springs 84 serve automatically to retract the crosshead to its normal starting position each time it is raised or moved upwards in connection with withdrawal of the needles from the subjacent belly. Such springs surround the ends of the shaft 80 and extend between the pivot blocks 81 and fixed collars 85 on the shaft 80. The inner ends of the springs 84 are anchored to the collars and the outer ends of the springs extend downwards and are provided with hooks around the upper ends of the arms 79. Retractile swinging movement of the needle carrying crosshead 70 in response to the action of the coil springs 84 is limited by way of a pair of rubber rollers 86. The latter are located adjacent, and coact with, the central portions of the arms 79 and are mounted on horizontally extending spindles 87 which are carried by U-shaped brackets 88 on the end portions of the crosspiece 30 of the U-shaped bracket 23. As shown in dotted lines in Figure 4 the brackets 88 overhang in a rearward direction the crosspiece 30. The springs 84 are tightly loaded in order quickly to retract the needle carrying crosshead directly after removal of the needles from the subjacent belly. The stop forming rollers 86 are preferably disposed a small distance forward of the rear ends of the blocks 81 in order that the arms 79, when in their retracted position, are tilted a small distance forwards to the end that the needles directly overlie the roller 39 as shown in Figure 4. By having the needles overlying the roller when the crosshead is in its retracted position the roller forms a firm support for the superjacent belly at the point where in connection with downward movement of the crosshead the needles penetrate such belly.

Associated with the needle carrying crosshead 70 is a series of parallel laterally spaced stripper fingers 89. Such fingers extend lengthwise of the frame structure and have the front ends thereof connected fixedly to a horizontally extending rock shaft 90. The rear ends of the fingers 89 are disposed adjacent, but are laterally offset with respect to, the needles 71 and serve to strip the subjacent belly from the needles in connection with withdrawal of the latter. The rock shaft 90 extends transversely of the frame structure and has at its ends trunnions which are journalled in upstanding bearings 91 on the central portions of the outwardly extending flanges 28 on the upper margins of the pan side walls 26. A weight 92 serves to urge the stripper fingers 89 downwards into contacting relation with the subjacent belly. Such weight is mounted for longitudinal sliding movement on an arm 93 which is disposed over and in parallel relation with the rear ends of the stripper fingers 89 and has its front end bent downwards and fixedly connected to the rock shaft 90. A set screw 94 serves to maintain the weight 92 in its various adjusted positions with respect to the arm 93. The central portions of the stripper fingers carry an upstanding splash wall 95 for confining any brine which is jetted forwards from the needles while the latter are out of penetrating relation with the subjacent belly. As shown in Figure 4, the splash wall 95 is disposed between the depending side pieces 31 of the inverted U-shaped bracket 23.

*Mechanism for automatically moving the needle carrying crosshead down and up*

The mechanism for moving the hollow crosshead 70 down and up in order to effect insertion of the needles into the subjacent belly and subsequent withdrawal therefrom comprises a cylinder-piston unit 96 and a control valve 97 for the unit and operates by way of air under pressure.

The unit 96 extends vertically and underlies the central portion of the horizontally extending shaft 80. It is mounted on a horizontally extending plate 98 and consists of a cylinder 99 and a piston 100. The plate is arranged so that the front portion thereof rests on, and is secured to, the central portion of, the crosspiece 30 of the inverted U-shaped bracket 23. The cylinder 99 of the unit 96 is provided at its lower end with a flat disc-like head 101 and has a flat head 102 at its upper end. The head 101 rests on, and is secured to, the mounting plate 98 and serves as a closure for the lower end of the cylinder 99. The other head, i. e., the head 102, extends across, and is suitably connected to, the upper end of the cylinder and forms a closure for the latter. The piston 100 is mounted for vertical sliding movement in the cylinder and is fixedly connected to the lower end of a vertically extending piston rod 103. The piston rod extends slidably through a stuffing box 104 on the head 102 and has its upper end fixedly secured to the central portion of the rod 80. When air under pressure is admitted into the upper end of the cylinder while the lower end of the cylinder is vented the piston 100 slides downwards and operates through the medium of the piston rod 103, the shaft 80 and the upstanding arm 79 to move the crosshead 70 downwards in order to bring the needles 71 into penetrating relation with the subjacent belly b. When air under pressure is introduced into the lower end of the cylinder 99 while the upper end of the cylinder is vented the piston 100 slides upwards and operates to move upwards the crosshead 70 in order to effect withdrawal of the needles.

The control valve 97 for the cylinder-piston unit 96 is mounted on the inner end of the sub-platform 58 and consists of a housing 105 and a spool type valve member 106. The housing 105 is provided with a bore 107 and five annular laterally spaced groove-like ports 108, 109, 110, 111 and 112 around and in communication with the bore 107. The position of the housing 105 is such that the bore 107 extends horizontally and also lengthwise of the frame structure. The ports 108 and 112 are located inwards of the ends of the bore 107 and are exhaust ports in that they communicate with atmosphere. The port 110 is located midway between the exhaust ports 108 and 112 and is connected by a pipe 113 to a source of air under pressure, such, for example, as a compressed air storage tank or a motor driven air compressor (not shown). The pipe 113 extends horizontally from the housing 105 and then upwards in close proximity to the vertically extending pipe 41 through which extend the conductors 40 for supplying electric current to the motor 35. The port 109 is disposed midway between the ports 108 and 110 and is connected to one end of a pipe 114. The other end of the pipe 114 is provided with a pair of branches 115 and 116. The branch 115 is connected to, and communicates with, the upper end of the cylinder 99 at a point a small distance beneath the head 102. The other branch, i. e., the branch 116, includes a check valve 117 and communicates with the upper end of the cylinder by way of an L-shaped duct 118 in the head 102. The check valve 117 opens when air under pressure flows from the port 109 through the pipe 114 and the branch 116 and embodies a small bleed or by-pass port (not shown). The port 111 is located midway between the ports 110 and 112 and is connected to one end of a pipe 119. The other end of the pipe 119 is provided with a pair of branches 120 and 121. The branch 120 is connected to and communicates with the interior of the cylinder 99 at a point a small distance above the head 101. The branch 121 includes a check valve 122 and communicates with the lower end of the cylinder by way of an L-shaped duct 123 in the head 101. The check valve 122 is like the check valve 117. It opens when air under pressure flows from the port 111 through the pipe 119 and the branch 121 and embodies a small bleed or by-pass port (not shown).

The spool type valve member 106 of the control valve 97 is slidably mounted in the bore 107 and has in the central portion thereof a pair of annular laterally spaced grooves 124 and 125. It is shiftable back and forth between two positions and embodies at its right hand end as viewed in Figures 8 and 9 a stem 126. The latter is disposed for the most part exteriorly of the housing 105 and embodies a head 127 at its outer end. A helical compression spring 128 surrounds the stem 126 and serves to urge the spool type valve member 106 into its right hand position as shown in Figures 8 and 10. The outer end of the spring 128 abuts against the head 127 and the inner end of the spring abuts against the housing 105. When the spool type valve member 106 is in its right hand position the groove 124 establishes communication between the ports 110 and 109 and the groove 125 establishes communication between the ports 111 and 112. As the result of this air under pressure flows from the pipe 113 through the port 110, the groove 124, the port 109, the pipe 114 and the branches 115 and 116 into the upper end of the cylinder 99 and the lower end of the cylinder is vented to atmosphere by way of the branches 120 and 121, the pipe 119, the port 111, the groove 125 and the port 112. When air under pressure enters the upper end of the cylinder 99 it forces the piston 100 downwards and this results in downward movement of the needle carrying crosshead 70 as heretofore described. When, in connection with downward sliding movement of the piston, the piston passes the branch 120 venting of the lower end of the cylinder is only by way of the aforementioned bleed or by-pass port in the check valve 122 and hence there is formed in the lower end of the cylinder an air cushion for yieldingly stopping or retarding further downward sliding movement of the piston. When the spool type valve member 106 is slid to the left against the force of the helical compression spring 128 the groove 125 establishes communication between the ports 110 and 111 and the groove 124 establishes communication between the ports 109 and 108. As the result of this air under pressure flows from the pipe 113 through the port 110, the groove 125, the port 111, the pipe 119 and the branches 120 and 121 into the lower end of the cylinder 99 and the upper end of the cylinder is vented to atmosphere by way of the branches 115 and 116, the pipe 114, the port 109, the groove 124 and the port 108. As soon as air under pressure enters the lower end of the cylinder 99 it forces the piston 100 upwards and this results in upward movement of the needle carrying crosshead 70. When in connection with upward sliding movement of the piston, the piston passes the branch 115 venting of the upper end of the cylinder is only by way of the bleed or by-pass port in the check valve 117 and hence an air cushion is formed in the upper end of the cylinder for yieldingly stopping or retarding further upward sliding movement of the piston. From the foregoing it is manifest that back and forth sliding movement of the spool type valve member 106 between its right and left hand positions results in the cylinder-piston unit 96 moving the needle carrying crosshead 70 down and up.

The mechanism for automatically moving the needle carrying crosshead down and up comprises in addition to the cylinder-piston unit 96 and the control valve 97, means for actuating the control valve in timed relation with continuous feed of the bellies under the needle carrying crosshead 70. Such means consists of a circular cam 129, a cam follower 130 and an upstanding lever 131. The circular cam 129 is eccentrically mounted on the shaft 44 as shown in Figure 5 and is keyed or otherwise fixedly secured to such shaft so as to rotate therewith. The cam follower 130 is in the form of a roller and is normally in engagement with the periphery of the cam 129. It is mounted rotatably on a horizontal pivot pin 132 which, as best shown in Figure 3, is connected to, and projects laterally from, the lower end of the upstanding lever 131. The lever is centrally fulcrumed on a horizontally extending pivot pin 133 which extends transversely of the frame structure and extends loosely through bearing plates 134 on the central portion of the lever 131. The upper end of the lever is aligned with the head 127 on the outer end of the stem 126 of the spool type valve member 106 and is provided with a horizontally extending spring loaded plunger 135. The latter extends lengthwise of the frame structure and is arranged so that the left hand end thereof as viewed in Figure 5 is in abutment with the head 127. The cam 129, in connection with rotation thereof, operates through the medium of the cam follower 130 to rock the upstanding lever 131 back and forth. When the lever is rocked in a counterclockwise direction as viewed in Figure 5 the plunger 135 shifts the spool type valve member 106 into its left hand position wherein, as previously pointed out, it so controls the air under pressure as to cause the piston 100 of the cylinder-piston unit 96 to slide upwards. When the lever 131 is rocked in the opposite direction the compression spring 128 slides the valve member 106 into its right hand position wherein it so controls the air under pressure as to cause downward sliding movement of the piston 100. The pivot pin 133 that constitutes the fulcrum for the upstanding lever 131 is eccentrically mounted on one end of a horizontal shaft 136. Such shaft extends transversely of the frame structure and has the central portion thereof extending through and journalled in a bearing 137 on an upright 138 which forms part of the frame structure and has one of the inner corners of the sub-platform 58 connected to it. The outer end of the shaft 136 is provided with a knob equipped radially extending hand lever 139 whereby the shaft may be rocked back and forth in order laterally to adjust the position of the pivot pin 133. By laterally adjusting the pivot pin 133 the length of time in which the hollow needles are in penetrating relation with the subjacent belly may be varied as desired. If, for example, the eccentrically disposed pivot pin 133 is by proper turning of the shaft 136 shifted to the left as viewed in Figure 5 the cam follower will respond to the action of the cam 129 for a comparatively long period of time with the result that the lever 131 will remain rocked in a counterclockwise direction for a comparatively long period of time. On the other hand, if the pivot pin 133 is shifted to the right as viewed in Figure 5 the cam follower will respond to the action of the cam 129 for a lesser period of time with the result that the lever 131 will remain in its counterclockwise rocked position for a lesser period of time. It is, therefore, apparent that by laterally adjusting the position of the fulcrum forming pivot pin 133 the length of time that the needles remain in the subjacent belly may be varied as desired.

In order releasably to lock the spool type valve member 106 in its left hand position as viewed in Figures 8 and 9 to the end that the needle carrying crosshead 70 will remain in its up position a latch device 140 is provided. This device comprises a horizontally extending rock shaft 141, a hand lever 142 and a disc-like member 143. The rock shaft 141 extends transversely of the frame structure and is located a short distance to the right of the upper end of the upstanding lever 131 as viewed in Figure 5. It is journalled in a pair of bearing plates 144, one of which is connected to the central portion of the aforementioned upright 138. The hand lever 142 is connected to, and projects radially from, one end of the rock shaft 141 and serves as a medium for rocking the shaft back and forth. The disc-like member 143 is fixed to, and mounted eccentrically on, the central portion of the rock shaft 141. It is in alignment with the upper end of the upstanding lever 131 and has a flat 145 on the portion thereof that is of greatest radius. When the rock shaft 141 is turned in a counterclockwise direction as viewed in Figure 5, the flat 145 is brought into engagement with the upper end of the lever 131 and serves to lock the lever in such position that it, in turn, through the medium of the spring loaded plunger 135, holds the spool type valve member 106 in its left hand position. When the rock shaft 141 is rocked in the other direction so as to swing the flat 145 on the disc-like member 143 away from the upper end of the lever the lever is released so that it is free to rock back and forth in response to the action of the cam 129 and the cam follower 130. The device 140 exemplifies or constitutes means for releasably holding the spool type valve member 106 in its left hand position to the end that the needle carrying crosshead 70 will remain in its up position when the apparatus is not in use.

*Mechanism for supplying brine under pressure to needle carrying crosshead*

The mechanism for supplying brine under pressure to the needle carrying crosshead 70 comprises a brine storage and supply tank 146, a pump 147 and a valve 148.

The tank 146 is suitably mounted on the front or receiving end of the frame structure and is supplied with brine by way of a pipe 149. The latter embodies a vertically extending section in close proximity to the pipes 44 and 113 and a horizontally extending section. The upper end of the vertically extending section is adapted for connection to any suitable source of brine supply. The horizontally extending section of the pipe 149 extends lengthwise of the frame structure and has one end thereof connected to the lower end of the vertically extending section and its other end connected to the upper portion of the tank 146. The end of the horizontally extending section that is connected to the tank is provided within the tank with a float valve 150 which serves automatically to cut off the flow of brine through the pipe 149 into the tank when the brine in the tank reaches a predetermined level. A vertically extending over-flow pipe 151 is located within the tank and has its lower end extending through, and suitably connected to, the bottom of the tank. A substantially horizontal drain pipe 152 has one end thereof connected to the lower end of the downwardly inclined pan bottom wall 25 and its other end connected to the back wall of the tank and serves to drain any brine that accumulates within the pan 22 back into the tank 146.

The pump 147 is mounted on the central portion of the platform 19. It is driven by an electric motor 153 and comprises a rotor (not shown) and a casing 154 around the rotor. The electric motor 153 is mounted on the platform 19 between the tank 146 and the pump 147 and has its armature shaft connected by a coupling 155 to the rotor of the pump. The pump casing 154 is provided with an inlet 156 and an outlet 157. The inlet 156 is connected to the bottom portion of the tank by way of a pipe 158. The receiving end of the pipe 158 is provided with a pair of oppositely extending branches 159, the ends of which extend upwards through the bottom wall of the tank and have strainers 160 connected to them. When the pump 147 is driven by the electric motor 153 it operates to draw brine from the tank and to force brine under pressure through the casing outlet 157.

The valve 148 is located over the inverted U-shaped bracket 23 of the frame structure and is disposed directly in front of the cylinder-piston unit 96. It is connected to, and depends for the most part from, an extension 161 on the head 102 and comprises a vertically elongated housing 162 and a vertically slidable valve member 163. The upper end of the housing 162 is provided with a reduced tubular part 164 which extends upwards through, and is connected by a press fit to, a vertically extending hole 165 in the extension 161. The interior of of the housing 162 of the valve 148 is divided by way of a centrally disposed crosspartition 166 into a lower inlet chamber 167 and an upper outlet chamber 168. The bottom of the lower inlet chamber 167 is closed by a cup-shaped screw plug 169. The crosspartition 166 is provided with a circular hole 170 in which fits snugly a tubular valve seat 171 whereby communication is established between the inlet and outlet chambers 167 and 168. The inlet chamber 167 is connected to the pump outlet 157 by way of a pipe 172 and consequently when the pump is in operation as the result of being driven by the electric motor 153 brine under pressure enters the chamber 167. The upper outlet chamber 168 is connected to the hollow needle carrying crosshead 70 by a pair of flexible hose connections 173. The inlet ends of the hose connections 173 are connected to diametrically opposite portions of the upper end of the housing 162 by nipple type couplings 174 and the other or discharge ends of the hose connections are connected to the end portions of the crosshead 70 by nipple type couplings 175. The brine under pressure that enters the outlet chamber 168 flows via the hose connections 173 into the crosshead 70 and then is discharged via the laterally extending orifices 72 in the lower ends of the needles. The conical valve member 163 of the valve 148 is disposed in the upper portion of the lower inlet chamber 167 and is shiftable upwards and downwards into and out of seated relation with the lower end of the tubular valve seat 171. A vertically extending helical compression spring 176 urges the conical valve member 163 upwards into its closed position. When the valve member is in such position there is no flow of brine under pressure from the inlet chamber 167 to the outlet chamber 168. When, however, the valve member is in its open position brine flows from the chamber 167 through the tubular valve seat 171 into the outlet chamber 168. The lower end of the compression spring 176 fits within the interior of the cup-shaped screw plug 169 and the upper end of the spring abuts against the lower end of the conical member 163. Said member is provided with an upwardly extending valve stem 177, the central portion of which extends through, and is slidably mounted in, the tubular part 164 on the upper end of the housing 162. The upper end of the stem 177 extends through a stuffing box 178 and is exteriorly disposed with respect to the upper end of the housing 162. When the stem 177 is depressed against the force of the spring 176 the conical valve member 163 slides downwards into its open position wherein it permits the flow of brine under pressure from the chamber 167 into the chamber 168. Associated with the valve 148 is means for automatically opening the valve each time the crosshead 70 is moved downwards to effect penetration of the lower ends of the needles 71 into the subjacent belly. Such means is in the form of a linkage comprising an arm 179, a link 180 and a lever 181. The arm 179 is fixedly connected to, and extends radially from, the central portion of the horizontally extending shaft 80 and projects upwards and rearwards as shown in Figures 1 and 4. The link 180 extends substantially vertically and has the upper end thereof connected to the outer end of the arm 179 by way of a pivot pin 182. The lever 181 is disposed under the shaft 180 and is forwardly and downwardly inclined. The rear end of the lever 181 is pivotally connected to the lower end of the link 180 by way of a pivot pin 183. The front end of the lever 181 is pivotally connected to a pair of upstanding pivot lugs 184 by way of a pivot pin 185. The lugs 184 are connected to the front end of the extension 182 on the head 102. When in connection with operation of the cylinder-piston unit 96, the shaft 80 moves downwards the lever 181, as the result of the action of the arm 179 and the link 180, swings downwards. Upward shift or movement of the shaft 80 results in upward swinging of the lever 181. On the portion of the lever that is directly inwards of the pivot pin 185 is a laterally extending lug 186 which overlies the upper end of the valve stem 177 and is provided with a vertically adjustable screw 187. The latter extends through a threaded hole in the lug 186 and is provided with a lock nut 188 for securing it in place. The arrangement of the screw 187 is such that when the lever 181 swings downwards in connection with downward shift of the shaft 80 the screw strikes against and depresses the valve stem 177 thus resulting in opening of the conical valve member 163. It is contemplated that the screw 187 will be so positioned or adjusted that it operates to open the conical valve member as soon as the lower ends of the needles are brought into penetrating relation with the subjacent belly. By adjusting the screw up or down the time of opening of the conical valve member 163 may be varied.

Operation

When it is desired to use the apparatus the electric motors 35 and 153 are started by closing the switches of the circuits therefor. As soon as the motor 35 is started it operates through the medium of the heretofore mentioned gearing to drive the shafts 34 with the tooth-equipped wheels 37 thereon. It also operates through the medium of the cam 129, the cam follower 130 and the lever 131 to shift the spool type valve member 106 back and forth with the result that the cylinder-piston unit 96 serves to move down and up the shaft 80. Upon starting of the electric motor 153 the pump 154 operates as hereinbefore described, to supply brine under pressure through the pipe 172 into the lower inlet chamber 167 of the valve 148. When a belly travels under the needles the needles, in connection with downward movement of the crosshead 70, penetrate the belly. As soon as the needles enter the belly the valve 148 opens with the result that brine under pressure is discharged into the belly through the laterally extending orifices 72. While the needles are discharging brine into the subjacent belly the crosshead and needles swing rearwards with the constantly moving belly. In connection with upward movement of the needle carrying crosshead the needles are withdrawn from the subjacent belly and the crosshead is returned to its normal starting position by the action of the coil springs 84. The crosshead moves down and up continuously in timed relation with the feed of the bellies under the needles with the result that each belly has a predetermined quantity of brine injected into it at spaced apart points throughout its area. The brine that is not injected into the bellies is caught by the pan 22 and is returned to the tank 146 by way of the drain pipe 152.

The apparatus is entirely automatic and serves to inject brine into the bellies to be treated with great rapidity. It is comparatively simple so far as design and construction are concerned and hence may be produced at a comparatively low cost.

Whereas the apparatus has been described as a medium for injecting brine into hog bellies it is to be understood that the apparatus may also be used to inject other curing liquid into other pieces of meat or the like. It is also to be understood that the invention is not to be restricted to the details set forth since these may be modified within the scope of the appended claims without departing from the spirit and scope of the invention.

Having thus described the invention what we claim as new and desire to secure by Letters Patent is:

1. An apparatus adapted to treat hog bellies or the like and comprising a frame structure, power driven means mounted on the frame structure, operative when driven continuously to feed the bellies to be treated one after the other in a substantially horizontal direction and embodying a series of closely spaced parallel horizontal shafts with teeth-equipped belly supporting wheels thereon, an electric motor and gearing between the motor and the shafts for driving the latter in one direction, a crosshead positioned over certain of the shafts, provided with a plurality of downwardly extending hollow needles, and having mounting means therefor whereby it is supported so that it is movable first downwards in order to bring the needles into penetrating relation with the subjacent belly, then laterally for a short distance with the subjacent belly, and then upwards so as to effect removal of the needles from said subjacent belly, power operated means on the frame structure for moving the crosshead downwards and upwards in rapid succession, means for retracting the crosshead laterally to its starting position each time the needles are withdrawn in connection with upward movement thereof, and means whereby curing liquid under pressure is caused to flow through the needles and into the subjacent belly each time the needles are brought into their said penetrating relation.

2. An apparatus adapted to treat hog bellies or the like and comprising: a frame structure; power driven means mounted on the frame structure and operative when driven continuously to feed the bellies to be treated one after the other in a substantially horizontal direction; an element mounted over the feed means to move downwards and upwards; a crosshead positioned between the element and said feed means, connected to said element so that it is movable downwards and upwards therewith and is also free to swing laterally relatively thereto, provided with a plurality of downwardly extending hollow needles, and adapted when the element moves downwards first to bring the needles into penetrating relation with the subjacent belly on the feed means and then to swing laterally for a short distance with said subjacent belly and when the element moves upwards to effect removal of the needles from said subjacent belly; pneumatic means operative to move said element downwards and upwards in rapid succession and embodying a cylinder-piston unit supported on the frame structure in close proximity to the element, an operating connection between the piston of the unit and said element, a valve adapted upon actuation thereof alternately to control the supply and exhaust of air to opposite ends of the cylinder of the unit, and coacting parts adapted to actuate the valve and arranged to operate in timed relation with the power driven feed means; means for retracting the crosshead laterally to its starting position each time the needles are withdrawn in connection with upward movement thereof; and means on the frame structure operative automatically each time the needles are brought into penetrating relation with the subjacent belly to force curing liquid under pressure through the needles and into said subjacent belly.

3. An apparatus adapted to treat hog bellies or the like and comprising: a horizontally elongated frame structure; means mounted on the frame structure, operative when driven continuously to feed the bellies to be treated in series form lengthwise of the frame structure and embodying a longitudinal series of closely spaced parallel horizontal shafts with teeth-equipped belly supporting wheels thereon, an electric motor and gearing between the motor and the shafts for driving the latter in one direction; a horizontally extending crosshead positioned over and transversely of certain of the shafts, provided with a longitudinal series of fixed downwardly extending spaced apart hollow needles, and having mounting means therefor whereby it is supported so that it is movable first downwards in order to bring the needles into penetrating relation with the subjacent belly, then laterally for a short distance with the subjacent belly, and then upwards so as to effect withdrawal of the needles from said subjacent belly; pneumatic means operative to move the crosshead downwards and upwards in rapid succession and embodying a cylinder-piston unit disposed adjacent, and having one of the parts thereof operatively connected to, the crosshead, a valve adapted upon actuation thereof alternately to control the supply and exhaust of air to opposite ends of the cylinder of the unit, and coacting parts adapted repeatedly to actuate the valve and including a cam connected for drive by the aforementioned gearing; means for retracting the crosshead laterally to its starting position each time the needles are withdrawn in connection with upward movement thereof; and means on the frame structure operative automatically each time the needles are brought into penetrating relation with the subjacent belly to force curing liquid under pressure through the needles and into said subjacent belly.

4. An apparatus adapted to to treat hog bellies or the like and comprising a frame structure, power driven means mounted on the frame structure and operative when driven continuously to feed the bellies to be treated one after the other in a substantially horizontal direction, an element mounted over the feed means to move downwards and upwards, a crosshead positioned under the element, connected to said element so that it is movable downwards and upwards therewith and is also free to swing laterally relatively thereto, provided with a plurality of downwardly extending hollow needles, adapted when the element moves downwards first to bring the needles into penetrating relation with the subjacent belly on the feed means and then to swing laterally for a short distance with said subjacent belly, and further adapted when the element moves upwards to effect withdrawal of the needles from said subjacent belly, means on the frame structure for moving said element downwards and upwards in rapid succession, means for retracting the crosshead laterally to its starting position each time the needles are withdrawn in connection with upward movement of the crosshead and element, and means on the frame structure operative automatically each time the needles are brought into penetrating relation with the subjacent belly to force curing liquid under pressure through the needles and into said subjacent belly, and embodying a valve adjacent the element and an operating connection between the element and the valve whereby the valve is actuated each time said element is moved downwards.

5. An apparatus adapted to treat hog bellies or the like and comprising a frame structure, power driven means mounted on the frame structure and operative when driven continuously to feed the bellies to be treated one after another in a horizontal direction, an element mounted over the feed means to move downwards and upwards, a crosshead located between the element and said feed means, connected to said element so that it is movable downwards and upwards therewith and is free to swing laterally relatively thereto, provided with a plurality of downwardly extending hollow needles, adapted when the element moves downwards to bring the needles into penetrating relation with the subjacent belly on the feed means and then to swing laterally for a short distance with the subjacent belly, and further adapted when the element moves upwards to effect withdrawal of the needles from said subjacent belly, pneumatic means operative to move the element downwards and upwards in rapid succession and including a cylinder-piston unit disposed adjacent the element and having the piston thereof operatively connected to said element, means for retracting the crosshead laterally to its starting position each time the needles are withdrawn in connection with upward movement of the crosshead and element, and means operative automatically each time the needles are brought into penetrating relation with the subjacent belly to force curing liquid under pressure through the needles and into said subjacent belly and including a valve disposed adjacent the cylinder-piston unit and an operating connection between the element and the valve whereby the valve is opened each time the element is moved downwardly.

6. An apparatus adapted to treat hog bellies or the like and comprising: a frame structure; power driven means mounted on the frame structure and operative when driven continuously to feed the bellies to be treated one after the other in a substantially horizontal direction; a crosshead positioned over the feed means, provided with a plurality of downwardly extending hollow needles, and mounted so that it is movable first downwards in order to effect insertion of the needles into the subjacent belly on said feed means, then laterally for a short distance with the subjacent belly, and then upwards so as to effect withdrawal of the needles from said subjacent belly; pneumatic means operative to move the crosshead downwards and upwards in rapid succession and embodying a cylinder-piston unit disposed adjacent the crosshead and having the piston thereof operatively connected to said crosshead, a valve adapted in connection with actuation thereof alternately to control the supply and exhaust of air to opposite ends of the cylinder unit, and coacting parts adapted repeatedly to actuate the valve and connected to operate in timed relation with said feed means; means for adjusting the timing cycle of said coacting parts in order to vary the length of time the needles remain in the subjacent belly; means for retracting the crosshead laterally to its starting position each time the needles are withdrawn in connection with upward movement thereof; and means operative automatically each time the needles are brought into inserted relation with the subjacent belly to force curing liquid under pressure through the needles and into said subjacent belly.

7. An apparatus adapted to treat hog bellies or the like and comprising: a frame structure; power driven means mounted on the frame structure and operative when driven to feed the bellies to be treated one after another in a horizontal direction and at a constant speed; a crosshead positioned over the feed means, provided with a plurality of downwardly extending hollow needles, and mounted so that it is movable first downwards in order to bring the needles into penetrating relation with the subjacent belly on said feed means, then laterally for a short distance with the subjacent belly, and then upwards so as to effect withdrawal of the needles from said subjacent belly; means operative to move the crosshead downwards and upwards in rapid succession and embodying a cylinder-piston unit disposed adjacent the crosshead and having the piston thereof operatively connected to said crosshead, a valve adapted in connection with actuation thereof alternately to control the supply and exhaust of fluid under pressure to opposite ends of the cylinder of the unit, and automatic actuating means for the valve provided with means for adjusting the timing cycle thereof in order to vary the length of time the needles in connection with downward and lateral movement of the crosshead remain in the subjacent belly; means for retracting the crosshead laterally to its starting positions each time the needles are withdrawn in connection with upward movement thereof; and means operative automatically each time the needles are brought into penetrating relation with the subjacent belly to force curing liquid under pressure through the needles and into said subjacent belly.

8. An apparatus adapted to treat hog bellies or the like and comprising a frame structure, power driven means mounted on the frame structure and operative when driven to feed the bellies to be treated one after another in a substantially horizontal direction and at a constant speed, a crosshead positioned over the feed means, provided with a plurality of downwardly extending hollow needles, and mounted so that it is movable first downwards in order to effect insertion of the needles into a subjacent belly on said feed means, then laterally for a short distance with the subjacent belly, and then upwards so as to effect removal of the needles from said subjacent belly, power actuated means operative to move the crosshead downwards and upwards in rapid succession and provided with an adjustment whereby the speed of downward and upward movement of the crosshead may be varied in order to vary as desired the length of time the needles in connection with downward and lateral movement of the crosshead remain in the subjacent belly, means for retracting the crosshead laterally to a starting position each time the needles are withdrawn in connection with upward movement thereof, and means for forcing curing liquid under pressure through the needles and into the subjacent belly when the needles are brought into inserted relation with said belly.

9. An apparatus adapted to treat hog bellies or the like and comprising a frame structure having means for supporting the bellies to be treated so that they are movable one after the other in a substantially horizontal direction, a hollow crosshead positioned over the supporting means, provided with a longitudinal series of downwardly extending spaced apart hollow needles with their upper ends in communication with the crosshead interior, and mounted so that it is movable downwards and upwards in order to effect insertion of the needles into the subjacent belly on said supporting means and subsequent withdrawal therefrom, power operated means on the frame structure for moving the crosshead downwards and upwards in rapid succession, and means associated with the frame structure, operative each time the needles are inserted into the subjacent belly to force curing liquid under pressure through the needles and into said subjacent belly, and embodying a curing liquid source, a motor driven pump having the inlet thereof connected to the source, a valve having an inlet chamber connected to the pump outlet, an outlet chamber in communication with the interior of the crosshead and a movable valve member between the two chambers, and an operating connection between the crosshead and valve for automatically opening the valve member each time the crosshead moves downward.

10. An apparatus adapted to treat hog bellies or the like and comprising: a horizontally elongated frame structure provided at the upper portion thereof with a longitudinally extending pan and in addition elongated foraminous tray means disposed over and lengthwise of the pan and adapted to have the bellies to be treated move in series form lengthwise thereover; a horizontally extending crosshead positioned over, and transversely of, said tray means, provided with a longitudinal series of downwardly extending spaced apart hollow needles with the upper ends thereof in communication with the interior of the crosshead, and mounted so that it is movable downwards and upwards in order to effect insertion of the needles into the subjacent belly on the tray means and subsequent withdrawal therefrom; power operated means on the frame structure for moving the crosshead downwards and upwards in rapid succession; mechanism operative each time the needles are inserted into the subjacent belly to force curing liquid under pressure through the needles and into said subjacent belly and embodying a curing liquid supply tank on the frame structure at a lower elevation than the pan, a motor driven pump having the inlet thereof connected to the tank; a valve having an inlet chamber connected to the pump outlet, an outlet chamber in communication with the crosshead interior and a movable valve member between the two chambers, and an operating connection between the crosshead and valve for automatically opening the valve member each time the crosshead moves downward; and a drain pipe between the pan and the tank for returning to the tank any excess curing liquid that is caught by said pan.

11. An apparatus adapted to treat hog bellies or the like and comprising: a horizontally elongated frame structure provided at the upper portion thereof with a longitudinally extending tray with a longitudinal series of rows of slots therein; power driven means mounted on the frame structure, operative when driven to feed the bellies to be treated in series form lengthwise over the tray and embodying a longitudinal series of spaced apart horizontal shafts under the rows respectively and with teeth equipped wheels having the upper portions thereof projecting upwards through the slots, an electric motor and gearing between the motor and the shafts for driving the latter in one direction; a horizontally extending crosshead positioned over, and transversely of, said tray, provided with a longitudinal series of downwardly extending spaced apart hollows needles, and mounted so that it is movable downwards and upwards in order to effect insertion of the needles into the subjacent belly on the tray and subsequent withdrawal therefrom; power operated means on the frame structure for moving the crosshead downwards and upwards in comparatively rapid succession; and means operative each time the needles are inserted into the subjacent belly to force curing liquid under pressure through the needles and into said subjacent belly.

12. An apparatus adapted to treat hog bellies or the like and comprising: a horizontally elongated frame structure provided at the upper portion thereof with a longitudinally extending pan and a horizontal tray extending lengthwise over the pan and provided with a longitudinal series of rows of slots therein; power driven means mounted on the frame structure, operative when driven to feed the bellies to be treated in series form lengthwise over the tray, and embodying a longitudinal series of spaced apart horizontal shafts under said rows respectively and with teeth equipped wheels having the upper portions thereof projecting upwards through the slots, an electric motor and gearing between the motor and the shafts for driving the latter in one direction; a hollow horizontally elongated crosshead positioned over and transversely of said tray, provided with a longitudinal series of downwardly extending spaced apart hollow needles with their upper ends in communication with the crosshead interior and mounted so that it is movable downwards and upwards in order to effect insertion of the needles into the subjacent belly on the tray and subsequent removal therefrom; power operated means on the frame structure for moving the crosshead downwards and upwards in comparatively rapid succession; mechanism operative each time the needles are inserted into the subjacent belly to force curing liquid under pressure through the needles and into said subjacent belly and embodying a curing liquid supply tank on the frame structure at a lower elevation than the pan, a motor driven pump having the inlet thereof connected to the tank, a valve having an inlet chamber connected to the pump outlet, an outlet chamber in communication with the crosshead interior and a movable valve member between the two chambers, and an operating connection between the crosshead and the valve for automatically opening the valve in connection with each downward movement of the crosshead; and a drain pipe between the pan and the tank for returning to the tank any excess curing liquid that is caught by said pan.

13. In an apparatus for injecting a liquid into pierceable, permeable bodies as they move continuously along a predetermined path, the combination comprising a pendulum arm pivotally supported at a spaced distance from said path and so as to oscillate in alignment therewith, a crosshead providing a manifold and carried by said arm at a spaced distance from said path, at least one injection needle extending from said crosshead toward said path, said needle having discharge orifices and a passage providing communication between said orifices and said manifold, means for periodically and bodily moving said arm toward and away from said path in order to embed said needle in one of said bodies in the inner position of said arm and to remove said needle from said body in the outer position of said arm, means for supplying said liquid to said manifold under pressure; means for returning said arm to its initial position after it is first swung in one direction as the result of said needle being embedded in said body while the latter is moving in said one direction along the path and is then moved away from said path, and a conveyor for continuously moving said permeable bodies along said predetermined path in said one direction and at a constant rate.

14. In an apparatus for injecting a liquid into pierceable, permeable bodies as they move continuously along a predetermined path, the combination comprising a pendulum arm pivotally supported at a spaced distance from said path and so as to oscillate in alignment therewith, a crosshead providing a manifold and carried by said arm at a spaced distance from said path, a plurality of laterally spaced injection needles extending from said crosshead towards the path, said needles having discharge orifices and passages providing communication between said apertures and said manifold, nipples interposed between said manifold and said needles and having ducts of restricted cross sectional area in order greatly to reduce the pressure within said needle passages from that in said manifold, means for periodically and bodily moving said arm toward and away from said path in order to embed said needles in one of said bodies in the inner position of said arm and to remove said needles from said body in the outer position of said arm; means for supplying said liquid to said manifold under pressure; means for returning said arm to its initial position after it is first swung in one direction as the result of said needles being embedded in said body while the latter is moving in said one direction along the path and then moved away from said path, and a conveyor for continuously moving said permeable bodies along said predetermined path in said one direction and at a constant rate.

15. The combination of claim 13 in which said means for supplying liquid to the manifold under pressure includes a control valve with an externally extending valve stem, and a linkage connected to said means for periodically moving said arm and equipped with a member for contacting the externally extending stem of said valve to open and close said valve in synchronism with the movements of said arm toward and away from said path.

16. In an apparatus for injecting pickling fluid into hog bellies or the like as they move continuously along a predetermined path, the combination comprising a frame having a platform above said path, a cylinder mounted on said platform and having a piston therein equipped with an upwardly extending rod and adapted to reciprocate downward and upward with respect to said path, two spaced arms carried by said rod and extending downwardly toward said path, a crosshead providing a manifold and extending between the lower end portions of said arms, across said path and at a spaced distance thereabove, a plurality of injection needles spaced apart across said path and extending downwardly from said crosshead, said needles having discharge orifices and passages providing communication between said apertures and said manifold, air pressure means for reciprocating said piston in order to lower and raise said arms and thus effect embedment of said needles in a belly and subsequent withdrawal therefrom, and means for supplying said pickling fluid to said manifold under pressure, said last-mentioned means including a control valve having an externally extending valve stem, actuating elements connected to said piston stem and equipped with a member for contacting the externally extending stem of said valve in such manner as to open and close said valve in synchronism with the down and up movements of said piston.

17. An apparatus adapted to treat hog bellies or the like and comprising a horizontally elongated frame structure, power driven means mounted on the frame structure and operative when driven continuously to feed the bellies to be treated in series form lengthwise of the frame structure, a horizontally extending crosshead positioned over and transversely of the feed means, provided with a longitudinal series of fixed downwardly extending spaced apart hollow needles, mounted so that it is movable first downwards in order to bring the needles into penetrating relation with the subjacent belly on said feed means, then laterally for a short distance with the subjacent belly and then upwards so as to effect withdrawal of the needles from said subjacent belly, and having associated therewith pneumatically actuated means for moving it downwards and upwards in rapid succession and in addition spring means for retracting it laterally to its starting position each time the needles are withdrawn in connection with upward movement thereof, and means operative automatically each time the needles are brought into penetrating relation with the subjacent belly to force curing liquid under pressure through the needles and into said subjacent belly.

18. An apparatus adapted to treat hog bellies or the like and comprising a frame structure, power driven means mounted on the frame structure and operative when driven continuously to feed the bellies to be treated one after the other in a horizontal direction, an element mounted over the feed means to move downwards and upwards, a crosshead positioned under the element, connected to said element so that it is movable downwards and upwards therewith and is also free to swing laterally relatively thereto, provided with a plurality of downwardly extending hollow needles, adapted when the element moves downwards first to bring the needles into penetrating relation with the subjacent belly on the feed means and then to swing laterally for a short distance with said subjacent belly, and further adapted when the element moves upwards to effect withdrawal of the needles from said subjacent belly, means on the frame structure for moving said element downwards and upwards in rapid succession, means for retracting the crosshead laterally to its starting position each time the needles are withdrawn in connection with upward movement of the crosshead and element, and means on the frame structure operative when the needles are brought into penetrating relation with the subjacent belly to force curing liquid under pressure through the needles and into said subjacent belly.

19. An apparatus adapted to treat hog bellies or the like and comprising a horizontally elongated frame structure, power driven means mounted on the frame structure and operative when driven continuously to feed the bellies to be treated in series form lengthwise of the frame structure, a horizontal element positioned over and transversely of the feed means and mounted to move downwards and upwards, a horizontally elongated transversely extending crosshead positioned between said feed means and the element, connected to said element by an upstanding arm with a pivotal connection between its upper end and the element in order that it is movable downwards and upwards with said element and is also free to swing laterally relatively thereto, provided with a longitudinal series of fixed downwardly extending spaced apart hollow needles, adapted when the element moves downwards first to bring the needles into penetrating relation with the subjacent belly on the feed means and then to swing laterally for a short distance with said subjacent belly and further adapted when the element moves upwards to effect withdrawal of the needles from said subjacent belly, means on the frame structure for moving said element downwards and upwards in rapid succession, spring means between the element and said upper end of the arm for retracting the crosshead laterally to its starting position each time the needles are withdrawn in connection with upward movement of the crosshead and element, and means on the frame structure operative when the needles are brought into penetrating relation with a subjacent belly to force curing liquid under pressure through the needles and into said subjacent belly.

20. In an apparatus for injecting pickling fluid into hog bellies or the like, the combination comprising conveyor means for moving the bellies continuously along a predetermined substantially horizontal path, a pendulum arm pivotally supported above said path and adapted to oscillate in alignment therewith, a crosshead providing a manifold and carried by said arm at a spaced distance above said path, a plurality of laterally spaced injection needles extending downwardly from said crosshead, said needles having discharged orifices and passages providing communication between said apertures and said manifold, means for lowering and raising said arm in order to embed said needles in a subjacent belly in the lower position of said arm and to elevate said needles above said belly in the upper position of said arm, means for supplying said pickling fluid to said manifold under pressure, said last-mentioned means including a control valve cooperating with said lowering and raising means to open and close said valve in synchronism with the movements thereof, yieldable spring means for returning said arm to an initial position after it is swung by the movement of said subjacent belly and subsequently elevated above said path, and stop means cooperating with said yieldable spring means in maintaining said arm in a starting position for the beginning of each injection cycle.

21. The combination of claim 20 in which there is interposed between said manifold and said needles nipples providing ducts of restricted cross sectional area adapted greatly to reduce the pressure within said needle passages from that in said manifold, whereby a substantially uniform amount of pickling fluid can be ejected from each needle into said subjacent belly independently of the varying texture of the belly.

22. In an apparatus for injecting pickling fluid into hog bellies or the like as they move continuously in one direction along a predetermined path, the combination comprising a pendulum arm pivotally supported above said path and adapted to oscillate in alignment therewith, a crosshead providing a manifold and carried by said arm at a spaced distance above said path, a plurality of laterally spaced injection needles extending downwardly from said crosshead, said needles having discharge orifices and passages providing communication between said orifices and said manifold, nipples interposed between said manifold and said needles providing ducts of restricted cross sectional area adapted greatly to reduce the pressure within said needle passages from that in said manifold, means for supplying said pickling fluid to said manifold under high pressure, and means for returning said arm to an initial position after it is swung in said one direction by a belly during an injection operation and subsequently elevated thereabove.

23. In an apparatus for injecting pickling fluid into hog bellies or the like as they move continuously along a predetermined path, the combination comprising a frame having a platform above said path, a cylinder mounted on said platform and having a piston therein equipped with an upwardly extending rod and adapted to reciprocate toward and away from said path, two spaced pendulum arms pivotally carried by said rod and extending downwardly toward said path, said arms being adapted to oscillate in alignment with said path, a crosshead providing a manifold and extending between the lower end portions of said arms, across said path and at a spaced distance thereabove, a plurality of injection needles spaced apart across said path and extending downwardly from said crosshead, said needles having discharge orifices and passages providing communication between said orifices and said manifold, air pressure means for reciprocating said piston in order to lower and raise said arms and thus cause embedment of said needles in a belly in the lower position of said piston and elevation of said needles above the belly in the upper position of said piston, means for supplying said pickling fluid to said manifold under pressure, said last-mentioned means including a control valve with an externally extending valve stem, actuating elements connected to said piston stem and equipped with a member for contacting the externally extending stem of said valve to open and close said valve in synchronism with the down and up movements of said piston, and means for returning said arms to their initial position after they are swung in said one direction by a belly during an injection operation and subsequently raised thereabove.

24. The combination of claim 23 in which nipples are interposed between said needle passages and said manifold, said nipples having ducts of restricted cross sectional area adapted greatly to reduce the pressure within said needle passages from that in said manifold, whereby a substantially uniform amount of fluid can be ejected from each of said needles into a belly independently of the varying textures of the belly.

25. The combination of claim 23 together with means for so controlling the reciprocation of said piston as to produce a uniform number of reciprocations per minute while permitting the time interval to be varied during which said piston is in its downwardmost position, whereby the quantity of pickling fluid injected into the belly during each injection cycle can be controlled by varying the period of dwell of said needles in said belly.

26. A structure for use in injecting pickling fluid into hog bellies or the like, comprising an elongated head member providing a manifold therein, a plurality of longitudinally spaced injection needles extending in one direction from said head member, said needles having discharge orifices and passages providing communication between said orifices and said manifold, nipples interposed between said needle passages and said manifold and providing ducts therein of such restricted cross sectional area that they are adapted greatly to reduce the pressure within said needle passages from that in said manifold, means for supplying said pickling fluid to said manifold under pressure, and means connected to the head member for exerting force on said head member to embed and withdraw said needles with respect to the hog bellies.

27. A structure for use in injecting pickling fluid into hog bellies or the like, comprising a movable head member providing a manifold therein, a plurality of spaced injection needles carried by said head member and extending in the same direction therefrom, said needles having discharge orifices and passages providing communication between said orifices and said manifold, flow restricting means interposed between said needle passages and said manifold adapted substantially to reduce the pressure within said needle passages from that in said manifold, and means for supplying pickling fluid to said manifold under pressure, whereby a substantially uniform amount of pickling fluid can be injected from each of said needles into a belly independently of the varying texture of the belly.

28. A structure for use in injecting pickling fluid into hog bellies or the like, comprising a support member, a plurality of spaced injection needles carried by said support member and extending in the same direction therefrom, said needles having discharge orifices and passages therein communicating with said orifices, conduit means including a manifold for supplying pickling fluid under pressure to said needle passages, said needle passages communicating with said manifold, and flow restricting means interposed between said needle passages and said manifold and adapted substantially to reduce the pressure within said needle passages from that in said manifold, whereby a substantially uniform amount of pickling fluid can be injected from each of said needles into a belly independently of the varying texture of the belly.

29. In an apparatus for injecting a liquid into pierceable, permeable bodies, the combination comprising conveyor means for moving the bodies continuously and in one direction along a predetermined path, a pendulum arm pivotally supported at a spaced distance from said path and adapted to oscillate in alignment therewith, at least one injection needle carried by said arm and extending therefrom toward said path, said needle having at least one discharge orifice and a passage therein communicating with said orifice, conduit means for supplying said liquid to said needle passage under pressure, and means for moving said arm towards and away from said path in order to embed said needle in a body in the inner position of said arm and to remove said needle from said body in the outer position of said arm, said arm being adapted to return to its initial position after it is swung in said one direction by a body in connection with an injection operation and subsequently moved away from said body.

30. An apparatus according to claim 29 in which there is also provided means for controlling the movement of said arm towards and away from said path in such manner as to produce a uniform number of reciprocations per minute while permitting the time interval to be varied during which said arm is in its inner position, whereby the quantity of liquid injected into the bodies can be controlled by varying the length of the interval during which said arm is in its said inner position.

NORMAN J. ALLBRIGHT.
RALPH W. ILLSLEY.
BERTIE S. HARRINGTON.

References Cited in the file of this patent

UNITED STATES PATENTS

| Number | Name | Date |
|---|---|---|
| 194,569 | Alberger | Aug. 28, 1877 |
| 1,494,174 | Lane | May 13, 1924 |
| 1,992,464 | Blackman | Feb. 26, 1935 |
| 2,466,772 | Kenyon | Apr. 12, 1949 |
| 2,503,147 | Applezweig | Apr. 4, 1950 |
| 2,520,719 | Hanson | Aug. 29, 1950 |
| 2,587,024 | Avery | Feb. 26, 1952 |

FOREIGN PATENTS

| Number | Country | Date |
|---|---|---|
| 502,486 | Germany | July 11, 1930 |